June 12, 1956 C. W. BEMMELS 2,750,314
ADHESIVE TAPE
Filed March 16, 1949

INVENTOR
CYRUS W. BEMMELS.
BY Norman St. Landau
ATTORNEY

United States Patent Office 2,750,314
Patented June 12, 1956

2,750,314

ADHESIVE TAPE

Cyrus W. Bemmels, New Brunswick, N. J., assignor to Permacel Tape Corporation, New Brunswick, N. J., a corporation of New Jersey Application March 16, 1949, Serial No. 81,707

15 Claims. (Cl. 154—53.5)

This invention relates to strand-reinforced adhesive tapes and more particularly to strand-reinforced tapes of the normally tacky and pressure-sensitive type.

Adhesive tapes of the prior art were satisfactory for many purposes but lacked the strength that is required for some applications such as packaging and particularly bundling of heavy or bulky articles and in fact any joining of multiple parts where the joints have to withstand considerable force. Thus the electrical industry considered prior tapes insufficiently strong for many splices that are required on heavy cables.

Pressure-sensitive tapes require a flexible backing which readily transmits the pressure applied thereto so as to bring the flexible adhesive film in nearly complete contact with the surface to be adhered. A backing that is too stiff is frequently responsible for insufficient adhesion and insufficient ability of the backing to tolerate shocks to which the adhesive joint may be subjected.

In view of the weakness of some prior adhesive tapes attempts were made frequently to increase their strength by increasing the gauge of their backings. In nearly all of the cases this produced a backing that was too bulky to follow the contours of articles to which the tape was applied and/or too stiff to permit ready attachment such as is required of a useful adhesive. Laminations of multiple layers to form composite backings performed similarly unsatisfactorily.

It is an object of the invention to provide an adhesive tape having great strength. It is a further object to provide an adhesive tape that performs satisfactorily in bundling and joining applications. A still further object is the provision of an adhesive tape that combines a high degree of flexibility with great strength. Another object is the provision of an adhesive tape wherein different layers exhibit little or no tendency to separate. Still other objects of the invention will be apparent as the invention is described more fully hereinafter.

Broadly, the objects of the invention are accomplished by providing an adhesive tape wherein the backing is bonded by a layer of a flexible bonding coat to a layer of strands of a strong, high tenacity material and the strand layer is covered by a continuous layer of a normally tacky and pressure-sensitive adhesive that is compatible with said bonding coat. For best performance the construction should preferably be substantially free of air holes between adjacent strands. To achieve this the intervals between these individual strands should be filled with bonding coat and usually also normally tacky and pressure-sensitive adhesive covering said strands.

To prevent separation of the strands during conditions of use, i. e., under stress and/or thermal shock, the bonding coat used is composed preferably of a soft rubber. The surprising discovery was made that use of soft rubber in this position tends to eliminate separation of the strands from the backing and from the adhesive tape structure which in absence of a bonding coat of soft rubber occurs occasionally in the use of products described in this specification. For many purposes, particularly satisfactory balancing of the adhesive and cohesive forces within the tape will be obtained if the bonding coat is a normally tacky and pressure-sensitive adhesive mass, which may, if desired, be of the same composition as or similar to the adhesive mass coat used on the surface of the tape.

For a further description of the invention, reference is made to the drawing illustrating by way of example only some preferred embodiments of the invention, and wherein.

Figure 1:
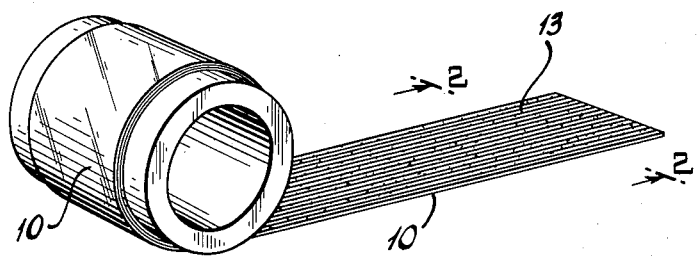
Fig. 1 is a perspective view of a roll of normally tacky and pressure-sensitive adhesive tape in accordance with the invention and having a film backing.
Figure 2:
Fig. 2 is a vertical sectional view through lines 2—2 of Fig. 3.

Referring more particularly to the drawing there is illustrated in Figs. 1 and 2 a roll of normally tacky and pressure-sensitive adhesive tape having a non-fibrous film backing 10 coated with a layer of bonding coat 11 which bonds thereto strands 12 of a strong high tenacity material. The individual strands 12 are covered by a layer 13 of normally tacky and pressure-sensitive adhesive material to exclude substantially any air space adjacent to them and to surround each strand on all sides with bonding coat and/or normally tacky and pressure-sensitive adhesive mass. It should be noted particularly that the intervals 14 between the strands 12 are filled by bonding coat or adhesive mass. If the strands have air adjacent to them or touch each other to the exclusion of the bonding coat or the pressure-sensitive adhesive mass an unbalanced tape results which is not adapted for prolonged use under the wide variety of extreme conditions which normally tacky and pressure-sensitive adhesive tape encounters frequently.

Figure 3:
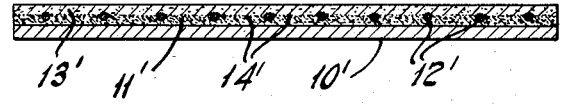
Fig. 3 is a vertical sectional view similar to Fig. 2 but illustrating a second embodiment of the invention wherein an internally bonded fibrous web is substituted for the non-fibrous film backing of Figs. 1 and 2.
Figure 4:
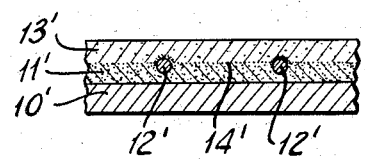
Fig. 4 is an enlarged fragment of Fig. 3.

Fig. 3 illustrates a construction that is similar in many respects to the construction of Figs. 1 and 2. Here, however, the backing 10' is of the fibrous-woven or non-woven type, the strands 12' are separated from each other by larger intervals 14' and are more firmly embedded in the bonding coat 11', and the normally tacky and pressure-sensitive adhesive coat 13' is thinner and merges with the bonding coat over the entire area as shown in Fig. 4. It should be understood, however, that any distance between strands that is in accord with the broad concept of the invention as stated and any thickness of the adhesive layer and of the bonding coat, within this broad inventive concept as stated earlier, may be used with either a non-fibrous or a fibrous-woven or non-woven backing. The invention is in many aspects equally applicable to fibrous and non-fibrous backings and serves with each to provide the additional strength and tenacity of non-woven uni-directional strands.

The backing used may be any of a wide variety of films such as ethyl cellulose film; cellulose acetate; cellulose acetate butyrate; cellulose propionate; polyvinylidene chloride-vinyl chloride and/or -acrylonitrile polymers such as saran; polyethylene; vinyl chloride polymers such as polymers of vinyl chloride and vinyl acetate; polyfluoroethylenes such as polytetrafluoroethylene and polytrifluorochloroethylene; polyvinyl alcohol; superpolyamides of the nylon type, polystyrene, e. g. the polymers of styrene and isobutylene; regenerated cellulose; benzyl cellulose; cellulose nitrate; gelatin; glycol celuose; flexibe acrylates and methacrylates; rubber films; chlorinated rubber; cyclized rubber; rubber hydrochloride; starch films; urea aldehyde films; polyvinyl acetal; polyvinyl butyral; and metallic films such as aluminum, copper, gold, iron, lead, magnesium, tin, and zinc foils.

If woven or non-woven fibrous backings are used they may be fibrous webs composed of superpolyamide, asbestos, cotton, linen, rayon, felt, matted glass, glassine, Japanese tissue, leather, a mixed rubber-fiber backing, paper, impregnated paper such as paper impregnated with rubbery masses similar to pressure-sensitive adhesives, coated paper, treated paper such as internally bonded, etherified, or parchmentized paper, rope paper, oriented paper, non-woven fibers bonded at intervals adhesively and any other coated impregnated or treated fibrous woven or non-woven backings.

The preferred strands are composed of glass, but any other strands of high tenacity and great strength may be substituted, e. g. those of cellulose acetate, cellulose propionate or other cellulose esters; superpolyamides of the nylon type; rayon preferably of the high tenacity type; vinylidene chloride interpolymers, e. g. with vinyl chloride and/or acrylonitrile; cotton threads; linen threads; silk threads. The term strand as used herein includes monofilaments as well as any of the fibers, as of the yarn, free of twist or twisted into a ropelike mass, the cable or rope thus made, and any wire or any of two or more wires twisted together into a single ropelike cable. Strands that are twisted are preferred as they are easier to anchor to the backing and make a more secure, tougher tape. A preliminary coating may be applied to the strands if desired to increase their adhesion to the adhesive and/or the bonding coat. The strands may be composed of one material or of several materials twisted or compounded together and several types of strands may be used in one and the same product.

As explained above the bonding coat may be a normally tacky and pressure-sensitive adhesive preferably based on a soft rubber cohesive agent or, in other preferred embodiments, may be based upon soft rubber or elastomer, i. e. a vulcanizable polymer similar to natural rubber and having the elastic properties of natural rubber. Among suitable rubbers are the interpolymers of butadiene with acrylic compounds having no additional aliphatic substitution or with acrylic compounds having merely substitution by a short alkyl group are suitable, and it should be noted that the longer the alcoholic radical (i. e. the part of the ester that is derived from the alcohol) in an acrylate molecule that is copolymerized with the butadiene, the more compatible is the resulting rubber with rubbers normally used in normally tacky and pressure-sensitive adhesives. Thus butadiene-ethyl methacrylate copolymers are less suitable for the invention than butadiene-nonyl methacrylate copolymers which are very well suited. Best suited are interpolymers of butadiene with acrylonitrile, methacrylonitrile, methyl acrylate, methyl methacrylate, ethyl acrylate, and/or other acrylic compounds wherein the acrylic group comprises a large proportion by weight of the molecule. Other rubbers that may be used to equal advantage are natural rubber, reclaimed rubber, butadiene-styrene and substituted styrene copolymers, polychloroprene, cyclized rubber or other heat-treated rubber, soft chlorinated rubber, or rubber hydrochlorides, polyisobutylene, including polyisobutylene which has been partially unsaturated by copolymerization with a minor portion of diene. Among butadiene interpolymers those comprising forty per cent or more of butadiene and including a significant portion of styrene, acrylonitrile and/or equivalent copolymerizing constituent are preferred. Too high an amount of the non-butadiene ingredient causes the rubber interpolymer to be relatively resinous and somewhat too stiff for best bonding action.

In some few embodiments of the invention where slight separation of the strand layer from the backing layer is not considered a disadvantage there may be substituted as bonding layer non-rubbery nitrocellulose, shellac, vinyl chloride-acetate polymers or maleic modified vinyl chloride-acetate polymers, vinyl chloride polymers, vinyl chloride-vinyl alcohol vinyl acetate-vinyl alcohol polymers, vinyl acetate polymers, polyvinyl acetals such as polyvinyl butyral, acetal, or formal, polyvinyl alcohol, styrene polymers such as high styrene ratio butadiene polymers, for example those of the 70:30 ratio and styrene-isobutylene polymers, acrylate and methacrylate polymers and copolymers, vinyl alkyl ethers, such as the polyvinyl butyl, propyl, pentyl, hexyl, heptyl, octyl, and methyl ethers, polyamides, ethyl cellulose, other cellulose derivatives, such as cellulose acetate, cellulose triacetate, cellulose proprionate, cellulose acetate butyrate, and benzyl cellulose, chlorinated and hydrochlorinated rubbers, balata, vinylidene chloride polymers, high acrylonitrile polymers, vinyl fluoride polymers, and any of the other bases that have sufficient cohesiveness and inherent tack.

For best results the bonding coat is applied to a dry coating weight of 0.1–3 ounces per square yard while the pressure-sensitive adhesive coat is spread to a dry coating weight of 0.5–5 ounces per square yard. These weights, however, are mentioned merely as preferred weights and satisfactory tape structures are possible without this coating weight range.

By way of introducing the following specific examples which are furnished merely to aid the understanding of the invention and not to limit its scope, reference is made hereafter to typical bonding coats and typical normally tacky and pressure-sensitive adhesive compositions upon which are based the tape structures of the examples:

BONDING COAT A

This bonding coat is composed of 10 parts by weight of butadiene-acrylonitrile polymer having a Mooney viscosity of 45, comprising 60% by weight butadiene and 40% acrylonitrile, and 10 parts by weight of polyisobutylene having a molecular weight of 80,000 to 120,000 all in 80 parts by weight of toluene.

BONDING COAT B

This bonding coat is composed of 10 parts by weight of butadiene acrylonitrile polymer having a Mooney viscosity of 50, comprising 75% butadiene and 25% acrylonitrile, and 10 parts by weight of GR–S X245 butadiene styrene copolymer, comprising 50 parts by weight of butadiene and 50 parts by weight of styrene and having a Mooney viscosity of approximately 40–50, all in 80 parts of toluene.

BONDING COAT C

This bonding coat is composed of 20 parts by weight of a polymer of 86% of vinyl chloride and 13% of vinyl acetate modified by one per cent of maleic anhydride, together with two parts of 75% butadiene–25% acrylonitrile copolymer as above, all in 78 parts of acetone.

BONDING COAT D

This bonding coat is composed of a 20 per cent solution of low hydroxy content (e. g. 11% by the acetic anhydride method) low viscosity (e. g. 70 centipoises in 5% solution commercial ethyl alcohol) polyvinyl butyral in isopropyl alcohol.

BONDING COAT E

This bonding coat is composed of 10 parts by weight of polyvinyl alcohol, hydrolyzed 86–89 per cent and having a viscosity of 20 to 25 centipoises at 20° C. when in 4% water solution, one part glycerine, 50 parts water and 39 parts isopropyl alcohol.

NORMALLY TACKY AND PRESSURE-SENSITIVE MASS 1

The composition contains the following parts by weight:

| | |
|---|---|
| GR-S 16 butadiene styrene polymer comprising 75 parts butadiene and 25 parts styrene, Mooney viscosity 90 | 12 |
| Hydrogenated rosin, melting point 83° C. | 8 |
| Acetone aniline condensation product as age resistor | 0.2 |
| Normal heptane | 79.8 |

NORMALLY TACKY AND PRESSURE-SENSITIVE MASS 2

This composition contains the following parts by weight:

| | |
|---|---|
| Smoked sheet natural rubber | 10 |
| Zinc oxide | 8 |
| Hydrogenated coumarone-indene resin, melting point 70° C.[1] | 8 |
| Lanolin | 3 |
| Alkylated polyhydroxy phenol as age resistor | 0.3 |
| Toluene | 70.7 |

[1] All melting points herein are determined by the ball and ring method.

NORMALLY TACKY AND PRESSURE-SENSITIVE MASS 3

This composition contains the following parts by weight:

| | |
|---|---|
| Reclaimed rubber (40% ash, 10% acetone extract, 50% hydrocarbon, specific gravity 1.30, Williams plasticity 2.5 mm.) | 18 |
| Aluminum hydrate | 4 |
| Polyterpene resin, melting point 70° C.[1] | 8 |
| Napthenic type mineral oil | 4 |
| Phenyl beta naphthylamine age resistor | 0.2 |
| Benzene | 65.8 |

NORMALLY TACKY AND PRESSURE-SENSITIVE MASS 4

This composition contains the following parts by weight:

| | |
|---|---|
| Polyisobutylene, molecular weight 120,000 | 16 |
| Liquid polyisobutylene | 8 |
| Dehydrogenated rosin, melting point 60° C.[1] | 4 |
| Alkylated polyhydroxy phenol age resistor | 0.3 |
| Toluene | 71.7 |

[1] All melting points herein are determined by the ball and ring method.

The following table illustrates typical examples executing the invention:

Table of examples

[Letters and Arabic reference numerals refer to the preceding bonding coat and adhesives listed]

| Example No. | I—(Preferred Bonding Coat) | II—(Preferred Bonding Coat) | III—(Preferred Bonding Coat) | IV | V | VI |
|---|---|---|---|---|---|---|
| Backing | Kraft Paper, creped, 27-pound basis weight per ream, impregnated with an equal dry weight of butadienestyrene copolymer latex (50% butadiene–50% styrene), backsized conventionally, e. g. with 0.2–0.3 ounces per square yard of a Shellac-dibutyl phthalate (5:1 ratio by weight) composition. | 1.5 mil cellulose acetate film, commercial grade. | 2-mil aluminum foil, dead soft, may be uncoated or preferably precoated with 0.25 oz./sq. yd. of Bonding Coat C. | 2-mil flat rope paper saturated with a composition comprising rubber, rosin and zinc oxide in a ratio by weight of 2:3:2 or any other conventional impregnant, and backsized, e.g. as in Example I. | 1-mil regenerated cellulose film. | Non-woven cotton fabric weighing 550 grams per square yard, bonded adhesively at quarter-inch intervals, for instance, by polyvinyl acetate, impregnated to the extent of over 100% of its weight with a copolymer substantially 60 parts butadiene and 40 parts acrylonitrile, backsized conventionally, e. g. as Example I, and either uncoated or preferably precoated with 0.5 ozs. per square yard of Bonding Coat C. |
| Bonding Coat | Adhesive Mass 3 | Bonding Coat B | Bonding Coat A | Bonding Coat D | Bonding Coat E [1] | Adhesive Mass 2. |
| Weight Applied (ounces per square yard). | 1.5 | 1.0 | 1.5 | 1.0 | 0.3 | 1.0. |
| Strand | High Tenacity Rayon, 40 Filaments, untwisted, or twisted, e. g. three turns per inch. | Cellulose Acetate, 15 Filaments per Strand, twist of 5 turns per inch. | Glass Strand, 408 Filaments and twist of 4.4 S turns per inch, one Z twist strand and one S twist strand plied together to balance each other against unraveling. | Glass Strand, 102 filaments twist of 5 turns per inch. | High Tenacity Rayon, 20 filaments per strand, twist of 5 turns per inch. | Nylon, 17 filaments per strand, twist of ½ turn per inch. |
| Strand Denier | 150 | 55 | 202 | 51 | 55 | 50. |
| Strands per Inch. | 100 | 40 | 5 | 15 | 100 | 20. |
| Normally Tacky and Pressure-Sensitive Adhesive. | Adhesive Mass 3 | Adhesive Mass 2 | Adhesive Mass 4 | Adhesive Mass 2 | Adhesive Mass 1 | Adhesive Mass 2. |
| Weight Applied (ounces per square yard). | 2.5 | 1.5 | 1.25 | 2.0 | 1.25 | 1.5. |

[1] If desired, the bonding coat herein may be coated with a thin layer (approximately 1 oz. per sq. yd.) of a suitable primer such as the polyvinyl alcohol-latex primer of Billings Patent 2,340,298 or the latex primer of Morris Patent 2,424,996.

Preferred methods of preparing the product of the invention follow:

The primer or bonding coat may be applied to the backing sheet by any of the conventional standard techniques such as direct and reverse roll, rubber roll and knife, or knife and rubber blanket. In the absence of solvent and if the backing is heat-stable, the coating may be applied from hot melt or on a calender. Following this and preferably while the adhesive is still wet, the strands are laminated in a continuous longitudinal direction on and in the adhesive coating.

In accordance with one practical manner of operation the desired number of strands are drawn from their individual spools and rewound as a single tow on a beam, and the tow from the beam then led through a comb or reed to space the strands properly and from there to the continuous backing sheet with the bonding coat in its activated fluid state. Under some circumstances the beam may be omitted and the strands led directly from the spools to the comb. The relation of the elements and the tension should be properly controlled to insure that the strands are at least partially embedded in the bonding coat, as shown for example in Fig. 2 where the primer or bonding coat 11 extends up around substantially one-half of the surface of the threads. It will be noted also that the lamination is best made in such a manner that there is an intervening area of cementing material between the threads, and the surface of the backing sheet 10. It has been found that a successful product results when the strands are completely imbedded in the bonding coat and the subsequently applied layer of tacky and pressure-sensitive adhesive merges directly with the bonding coat over the entire surface area as indicated in Fig. 4. Such relative proportions and arrangement may also of course be employed in the tape of Fig. 2 embodying a non-fibrous backing. The strands may be so imbedded by the application of pressure or by concurrent application of the bonding coat and the strands and controlling the position of the latter through suitable guides and passing the strands under knives used for the coating.

After the bonding coat has dried (or cooled as the case may be) the laminated sheet is coated with the desired coating of normally tacky and pressure-sensitive adhesive mass using any of the coating methods suggested above for application of the bonding coat. Each of the examples provides sufficient bonding to hold the strands and to prevent air holes between strands if sufficient tension is applied in anchoring them.

As described above the bonding coat and the outer adhesive coat are applied in successive steps. It is also possible to employ a single composition and/or to apply in one combined operation a sufficiently thick coating of pressure-sensitive adhesive to imbed therein simultaneously the reinforcing threads. The threads may be so imbedded by the application of pressure or by control of their position in the concurrent application of the adhesive and threads through suitable guides and by passing them under knives used for coating. When so made, however, care should be taken that the heavy coating is adequately dried and at a sufficiently slow rate to avoid skin drying with incomplete removal of the liquid solvent from the innermost areas. However the coatings are applied, the procedure and compositions employed must be such that there will be a preferential adherence of the coating to the backing so as to avoid delamination or offsetting in the use of the product.

In general, of course, the character of the coatings and the manner of application are dependent somewhat on the backing material employed. In this connection it has been found that a backing of unified plain kraft paper together with threads of glass yarn or nylon applied in conjunction with a primer coat and an upper pressure-sensitive adhesive coating provide a particularly satisfactory tape from the standpoint of manufacturing procedure, possessing remarkable strength though relatively thin, and having the desired characteristics in use such as freedom from offsetting or delamination.

The drawings indicate in general a narrow ribbon or tape of conventional width. As a manufacturing economy, however, the material will normally be made in wide sheets in the manner described above and then passed through a standard slitting machine to cut the composite sheet into individual tapes of the desired width, which commonly is about ¾ to 1 inch but for particular uses may be as little as ¼ inch, as much as 3 inches or more or less.

The adhesive sheets of the invention, and particularly those having soft rubber bonding coats form extremely tough, strong and useful normally tacky and pressure-sensitive products.

In addition to the embodiments described above by way of example only, many variations of the invention will occur to those skilled in the art and are considered embodied within the inventive concept.

The claims are:

1. A normally tacky and pressure-sensitive adhesive tape comprising a non-woven backing, a layer of soft, rubbery and cohesive bonding coat comprising a soft rubber thereon, a layer of parallel strands of strong, high tenacity rayon extending longitudinally of said tape on said bonding coat and spaced laterally from each other, and a continuous layer of a normally tacky and pressure-sensitive adhesive covering said layer of strands and said bonding coat, in which adhesive tape the spaces between the adjacent strands are substantially filled with pressure-sensitive adhesive and covered to the substantial exclusion of air, said strands being disconnected mechanically from each other and being retained in their individual positions solely by adhesive means.

2. A normally tacky and pressure-sensitive adhesive tape comprising a film backing, a layer of soft, rubbery and cohesive bonding coat comprising soft rubber thereon, a layer of parallel strands of strong, high tenacity material extending longitudinally of said tape on said bonding coat and spaced laterally from each other, and a continuous layer of a normally tacky and pressure-sensitive adhesive covering said layer of strands and said bonding coat, in which adhesive tape the spaces between the adjacent strands are substantially filled with pressure-sensitive adhesive and covered to the substantial exclusion of air, said strands being disconnected mechanically from each other and being retained in their individual positions solely by adhesive means.

3. A normally tacky and pressure-sensitive adhesive tape comprising a non-woven backing, a layer of soft, rubbery and cohesive bonding coat composed of soft rubber thereon, a layer of parallel twisted strands of strong, high tenacity material extending longitudinally of said tape on said bonding coat and spaced laterally from each other, and a continuous layer of a normally tacky and pressure-sensitive adhesive covering said layer of strands, in which adhesive tape the spaces between the adjacent strands are substantially filled with pressure-sensitive adhesive and covered to the substantial exclusion of air, said strands being disconnected mechanically from each other and being retained in their individual positions solely by adhesive means.

4. A normally tacky and pressure-sensitive adhesive tape comprising a backing, a layer of soft, rubbery and cohesive bonding coat thereon, a layer of parallel strands of strong, high tenacity material extending longitudinally of said tape on said bonding coat and spaced laterally from each other, and a continuous layer of a normally tacky and pressure-sensitive adhesive covering said layer of strands and said bonding coat, in which adhesive tape the spaces between the adjacent strands are substantially filled with pressure-sensitive adhesive and covered to the substantial exclusion of air, said strands being disconnected mechanically from each other and being retained in their individual positions solely by adhesive means.

5. A normally tacky and pressure-sensitive adhesive tape comprising a non-woven backing, a layer of soft, rubbery and cohesive bonding coat thereon, a layer of parallel twisted strands of strong, high tenacity material extending longitudinally of said tape on said bonding coat and spaced laterally from each other, and a continuous layer of normally tacky and pressure-sensitive adhesive covering said layer of strands and said bonding coat, in which adhesive tape the spaces between the adjacent strands are substantially filled with said bonding coat and covered to the substantial exclusion of air, said strands being disconnected mechanically from each other and being retained in their individual positions solely by adhesive means.

6. A normally tacky and pressure-sensitive adhesive tape comprising a non-woven backing, a layer of soft, rubbery and cohesive bonding adhesive thereon, an outer continuous covering layer of a normally tacky and pressure-sensitive adhesive, and a plurality of relatively strong reinforcing strands extending longitudinally of said tape and spaced laterally from each other, said strands being completely imbedded in the adhesive below the outer surface and individually surrounded by adhesive with the spaces between adjacent strands substantially filled with adhesive to the substantial exclusion of air, said strands being disconnected mechanically from each other and being retained in their individual positions solely by adhesive means.

7. A reinforced pressure-sensitive tape comprising a flexible backing sheet in long strip form; an adhesive coating including an upper continuous surface of normally tacky and pressure-sensitive adhesive, a plurality of relatively strong individual reinforcing strands extending longitudinally of said strip and spaced laterally from each other, said strands being located below the outer surface and completely surrounded by adhesive and with the spaces between adjacent strands substantially filled with adhesive to the substantial exclusion of air, said strands being disconnected mechanically from each other and being retained in their individual positions solely by adhesive means.

8. A reinforced pressure-sensitive adhesive tape comprising a flexible backing, a coating thereon presenting an outer, continuous and normally tacky and pressure-sensitive adhesive surface, and a plurality of relatively strong individual reinforcing strands extending longitudinally of the tape and embedded in said coating below the outer surface thereof in lateral spaced relation with respect to each other, said coating substantially surrounding said strands and filling the spaces therebetween to the substantial exclusion of air, and said strands being mechanically disconnected from each other except for the coating in which they are embedded and which serves as the sole means for retaining them in their individual positions.

9. A reinforced pressure-sensitive adhesive tape comprising a flexible backing, a coating thereon including an inner soft, rubbery cohesive bonding layer and an outer normally tacky and pressure-sensitive adhesive layer, and a plurality of relatively strong individual reinforcing strands extending longitudinally of the tape and embedded in said coating below the outer surface thereof in lateral spaced relation with respect to each other, said coating substantially surrounding said strands and filing the spaces therebetween to the substantial exclusion of air, and said strands being mechanically disconnected from each other except for the coating in which they are embedded, and which serves as the sole means for retaining them in their individual positions.

10. A reinforced pressure-sensitive adhesive tape comprising a flexible backing, a coating thereon including an inner soft, rubbery cohesive bonding layer and an outer normally tacky and pressure-sensitive adhesive layer, and a plurality of relatively strong individual reinforcing strands extending longitudinally of the tape and embedded in said inner bonding layer in lateral spaced relation with respect to each other, said inner bonding layer substantially surrounding said strands and filling the spaces therebetween to the substantial exclusion of air, and said strands being mechanically disconnected from each other except for the coating in which they are embedded and which serves as the sole means for retaining them in their individual positions.

11. A pressure-sensitive adhesive tape having two opposed surfaces, and comprising a thin, flexible backing in long strip form and a continuous, normally tacky, and pressure-sensitive adhesive, said tape including reinforcing means disposed between the two opposed surfaces thereof, said reinforcing means comprising a plurality of relatively strong individual reinforcing strands extending longitudinally of the length of said tape, and flexible, stretchable, cohesive material substantially surrounding and adhering to said strands, said strands being bonded in said tape by said material, spaces between said strands being substantially filled with said material to the substantial exclusion of air, said tape having cohesion greater than the adhesion of said adhesive surface to the back of the preceding convolution when said tape is wound upon itself in roll form whereby said tape can be unwound without substantial delamination, said strands being embedded in said material in such a manner that the individual strands are independent of each other and capable of limited movement relative to each other therewithin, whereby a tensile stress applied longitudinally to a length of said tape is distributed among said strands.

12. A normally tacky pressure-sensitive adhesive tape comprising a thin backing of flexible, stretchable, cohesive material in long strip form, a layer of flexible, stretchable, cohesive material adhering to said backing and having a continuous, normally tacky and pressure-sensitive adhesive surface, said materials having cohesion greater than the adhesion of said surface to the back of the preceding convolution when said tape is wound upon itself in roll form whereby said tape can be unwound without substantial delamination, and a plurality of relatively strong individual reinforcing strands extending longitudinally of the length of said tape, in which adhesive tape said strands are substantially surrounded by such flexible, stretchable, cohesive material, and are bonded in said tape by adhesion to said strands of such material, spaces between said strands being substantially filled with such material to the substantial exclusion of air, said strands being embedded in such material in such a manner that the individual strands are independent of each other and capable of limited movement relative to each other therewithin, whereby a tensile stress applied longitudinally to a length of said tape is distributed among said strands.

13. A normally tacky and pressure-sensitive adhesive tape comprising a non-woven backing, a layer of soft, rubbery and cohesive bonding material thereon, a plurality of parallel strands of strong, high tenacity rayon extending longitudinally of said tape on said bonding material, and a continuous layer of a soft, rubbery and cohesive normally tacky and pressure-sensitive adhesive material covering said strands and said bonding material, in which adhesive tape spaces between adjacent strands are substantially filled with soft, rubbery and cohesive material, and said strands are substantially surrounded by such material to the substantial exclusion of air, and are retained in their individual positions solely by such material.

14. A normally tacky and pressure-sensitive adhesive tape comprising a film backing, a layer of soft, rubbery and cohesive bonding material thereon, a plurality of parallel strands of strong, high tenacity material extending longitudinally of said tape on said bonding material, and a continuous layer of a soft, rubbery and cohesive normally tacky and pressure-sensitive adhesive material covering said strands and said bonding material, in which adhesive tape spaces between adjacent strands are substantially filled with soft, rubbery and cohesive material, and said strands are substantially surrounded by such material to the substantial exclusion of air, and are retained in their individual positions solely by such material.

15. A normally tacky and pressure-sensitive adhesive tape comprising a flexible backing, a layer of soft, rubbery and cohesive bonding material thereon, a plurality of parallel twisted strands of strong, high tenacity material extending longitudinally of said tape on said bonding material, and a continuous layer of a soft, rubbery and cohesive normally tacky and pressure-sensitive adhesive material covering said strands, in which adhesive tape spaces between adjacent strands are substantially filled with soft, rubbery and cohesive material, and said strands are substantially surrounded by such material to the substantial exclusion of air, and are retained in their individual positions solely by such material.

References Cited in the file of this patent

UNITED STATES PATENTS

| | | |
|---|---|---|
| 855,322 | MacCallum | May 28, 1907 |
| 1,255,818 | Jackson | Feb. 5, 1918 |
| 1,351,374 | Crowell | Aug. 31, 1920 |
| 1,446,094 | Jackson | Feb. 20, 1923 |
| 1,872,316 | Meeker | Aug. 16, 1932 |
| 2,000,475 | O'Donnell | May 7, 1935 |
| 2,089,405 | Newkirk | Aug. 10, 1937 |
| 2,283,202 | Guyard | May 19, 1942 |
| 2,283,349 | Angier | May 19, 1942 |
| 2,293,246 | Fay | Aug. 18, 1942 |
| 2,311,572 | Reynolds | Feb. 16, 1943 |
| 2,352,463 | Wenzelberger et al. | June 27, 1944 |
| 2,444,830 | Kellgren et al. | July 6, 1948 |
| 2,604,424 | Mathes | July 22, 1952 |

FOREIGN PATENTS

| | | |
|---|---|---|
| 149,447 | Great Britain | Aug. 17, 1920 |
| 470,558 | Germany | May 1, 1927 |